United States Patent
Emanuel et al.

(10) Patent No.: US 9,026,641 B2
(45) Date of Patent: May 5, 2015

(54) SYSTEM AND METHOD FOR MANAGEMENT OF INFORMATION STREAMS DELIVERED FOR USE BY A USER

(75) Inventors: Dotan Emanuel, Herzliya (IL); Tal Elad, Holon (IL); Amos Yoffe, Kibbutz Ramat-Yohanan (IL); Sol Tzvi, Herzliya (IL)

(73) Assignee: Genieo Innovation Ltd., Herzliya (IL)

( * ) Notice: Subject to any disclaimer, the term of this patent is extended or adjusted under 35 U.S.C. 154(b) by 528 days.

(21) Appl. No.: 12/713,837

(22) Filed: Feb. 26, 2010

(65) Prior Publication Data

US 2010/0299432 A1 Nov. 25, 2010

Related U.S. Application Data

(60) Provisional application No. 61/213,450, filed on Jun. 10, 2009, provisional application No. 61/213,254, filed on May 20, 2009.

(51) Int. Cl.
  *G06F 15/173* (2006.01)
  *G06F 17/30* (2006.01)

(52) U.S. Cl.
  CPC ...... *G06F 17/3089* (2013.01); *G06F 17/30873* (2013.01)

(58) Field of Classification Search
  USPC .................................. 709/223–226
  See application file for complete search history.

(56) References Cited

U.S. PATENT DOCUMENTS

| | | | |
|---|---|---|---|
| 6,381,656 B1 * | 4/2002 | Shankman | 714/E11.206 |
| 6,671,715 B1 * | 12/2003 | Langseth et al. | 709/203 |
| 7,086,002 B2 | 8/2006 | Elo et al. | |
| 7,293,019 B2 | 11/2007 | Dumais et al. | |
| 7,454,461 B2 | 11/2008 | Punaganti Venkata et al. | |
| 7,512,569 B2 | 3/2009 | Isaacs | |
| 7,523,137 B2 | 4/2009 | Kass et al. | |
| 7,536,320 B2 | 5/2009 | McQueen, III et al. | |
| 7,631,260 B1 | 12/2009 | Riggs et al. | |
| 7,640,184 B1 | 12/2009 | Lunt | |
| 7,853,655 B2 * | 12/2010 | Nussey | 709/206 |
| 8,078,624 B2 * | 12/2011 | Daya | 707/741 |
| 8,090,877 B2 * | 1/2012 | Agarwal et al. | 709/246 |
| 8,176,343 B2 * | 5/2012 | Lee | 709/223 |
| 8,316,005 B2 * | 11/2012 | Moore | 707/707 |
| 2003/0000369 A1 * | 1/2003 | Funaki | 84/609 |
| 2005/0267973 A1 * | 12/2005 | Carlson et al. | 709/228 |
| 2007/0027932 A1 | 2/2007 | Thibeault | |

(Continued)

OTHER PUBLICATIONS

URL: https://addons.mozilla.org/en-US/firefox/addon/4689
Retrieved: Feb. 12, 2010.

(Continued)

*Primary Examiner* — Minh-Chau Nguyen
(74) *Attorney, Agent, or Firm* — M&B IP Analysts, LLC

(57) ABSTRACT

A method for management of information streams delivered for use by a user of a user device comprises discovering information streams relevant to the user using a plurality of uniquifiers, wherein each uniquifier of the plurality of uniquifier characterizes the user; adding the discovered information streams to a list of approved information streams; registering to at least one information stream in the list of approved information streams; filtering data provided by the at least one information stream using the plurality of uniquifiers; and providing a feedback based on the user usage of the filter data to enable improved future discovery and filtering.

20 Claims, 4 Drawing Sheets

(56) References Cited

U.S. PATENT DOCUMENTS

| | | |
|---|---|---|
| 2007/0055731 A1* | 3/2007 | Thibeault ............... 709/204 |
| 2007/0083468 A1 | 4/2007 | Wetherell |
| 2007/0094346 A1 | 4/2007 | Nussey |
| 2007/0094391 A1 | 4/2007 | Nussey |
| 2007/0100959 A1* | 5/2007 | Eichstaedt et al. ......... 709/217 |
| 2007/0162432 A1 | 7/2007 | Armstrong et al. |
| 2007/0168367 A1 | 7/2007 | Dickinson et al. |
| 2007/0226734 A1 | 9/2007 | Lin et al. |
| 2008/0010294 A1 | 1/2008 | Norton et al. |
| 2008/0049629 A1* | 2/2008 | Morrill ............... 370/250 |
| 2008/0091767 A1* | 4/2008 | Afergan et al. ............ 709/202 |
| 2008/0091796 A1* | 4/2008 | Story et al. ............ 709/217 |
| 2008/0162510 A1 | 7/2008 | Baio et al. |
| 2009/0106768 A1 | 4/2009 | Ramanathan et al. |
| 2009/0248494 A1* | 10/2009 | Hueter et al. ............ 705/10 |
| 2010/0040209 A1* | 2/2010 | Bednarczyk et al. ...... 379/93.01 |

OTHER PUBLICATIONS

URL: http://feedrinse.com/ Retrieved: Feb. 12, 2010.
URL: http://www.feedscrub.com/ Retrieved: Feb. 12, 2010.
URL: http://www.my6sense.com/website/a/MainPage Retrieved: Feb. 12, 2010.

* cited by examiner

SYSTEM AND METHOD FOR MANAGEMENT OF INFORMATION STREAMS DELIVERED FOR USE BY A USER

CROSS-REFERENCE TO RELATED APPLICATIONS

This application claims the benefit of U.S. provisional application No. 61/213,450 filed on Jun. 10, 2009 and U.S. provisional application No. 61/213,254 filed on May 20, 2009, the contents of which are herein incorporated by reference.

TECHNICAL FIELD

The present invention relates generally to automatic selection of data from an information stream, and more specifically to automatically selecting, registering, filtering and displaying data from information streams such as RSS feeds.

BACKGROUND OF THE INVENTION

Really Simple Syndication (RSS) feeds have become a common way for content sites to publish their content and provide content updates. Users can easily register to those RSS feeds and receive the data, provided in a push mode, into their RSS reader applications. The RSS format is standardized and well-defined, registration is easy, and most importantly, practically all major content providers provide RSS feeds and RSS reader applications free of charge. RSS feeds and other syndication feeds (e.g., Atom Syndication format) are examples for information streams pushed to users.

Despite the obvious benefits of RSS feeds, widespread usage of RSS feeds is not happening. There seems to be two major reasons for that shortfall. Firstly, management of the RSS feeds, i.e., finding an appropriate RSS feed, subscribing to the RSS feed and unsubscribing there from, are time and attention consuming processes which many users prefer to avoid. Secondly, there is an issue with data overload resulting from the RSS feed providing a constant flow of data. Some of the data maybe relevant, while other data maybe less relevant or not relevant at all. For example, being a user of the CNN RSS feed does not mean that the user intends to read every news item on every topic pushed by the CNN's RSS feed. Even if a user is interested in a narrower area, like technology, the user might not be interested in every aspect of technology and wish to have an even narrower feed of content. As a result the user is required to provide more and more information about specific preferences in order to reduce bombardment of data provided through the RSS feed.

There are several solutions provided in the art attempting to overcome certain aspects of the issues discussed above. Typically, solutions focus on filtering the data as a web service that is provided to the user. For example, BlogRovR fetches, during browsing, posts from a user's preferred blogs about the page being accessed. It enables the display of post summaries that can be open and read without leaving the viewed page. Feed Rinse is another example for a web service that is an easy to use tool that enables automatically filtering out of syndicated content that the user is no interested in. It's like a spam filter for your RSS subscriptions. Yet another example is Feedscrub that acts as a spam filter for RSS feeds. By teaching the system the user's preference a better feed is provided and thereby protection from information overload is achieved. Another web service is provided by My6sense that prioritizes content from RSS feeds received by the user. User preferences, indicating the most important content to the user, are typically provided manually by the user immediately with respect to the content provided. Hence, in such systems there is no need for the user to set preferences in advance but rather, the user gives explicit feedback.

Nevertheless, the prior art solutions do not overcome much of the total burden placed on the user with respect to selection of desired RSS feeds and de-selection there from. Furthermore, existing solutions do not provide content based on changing needs of the user. In view of the limitations of mentioned above, it would be advantageous to provide a system and method thereof that overcome such limitations.

SUMMARY OF THE INVENTION

Certain embodiments of the invention include a method for management of information streams delivered for use by a user of a user device. The method comprises discovering information streams relevant to the user using a plurality of uniquifiers, wherein each uniquifier of the plurality of uniquifier characterizes the user; adding the discovered information streams to a list of approved information streams; registering to at least one information stream in the list of approved information streams; filtering data provided by the at least one information stream using the plurality of uniquifiers; and providing a feedback based on the user usage of the filter data to enable improved future discovery and filtering.

Certain embodiments of the invention further include a system for management of information streams delivered for use by a user of a user device. The system comprises a uniquifier generator and manager (UGM) for answering queries responsive to data collected by a plurality of sensors, wherein answers are provided based on a plurality of uniquifiers characterizing the user; a discovery engine (DE) for discovering information streams relevant to the user based on queries presented to the UGM and answers received thereto, wherein the discovered information streams are added to a list of approved information streams; a filtering engine (FE) for registering to at least one approved information stream in the list of approved information streams and filtering data provided by the at least one approved information stream based on queries presented to the UGM and answers received thereto; and; and a feedback engine (FBE) for monitoring usage of the filtered data by the user of the user device and initiating a release of an information stream found not to be applicable to the user of the user device.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
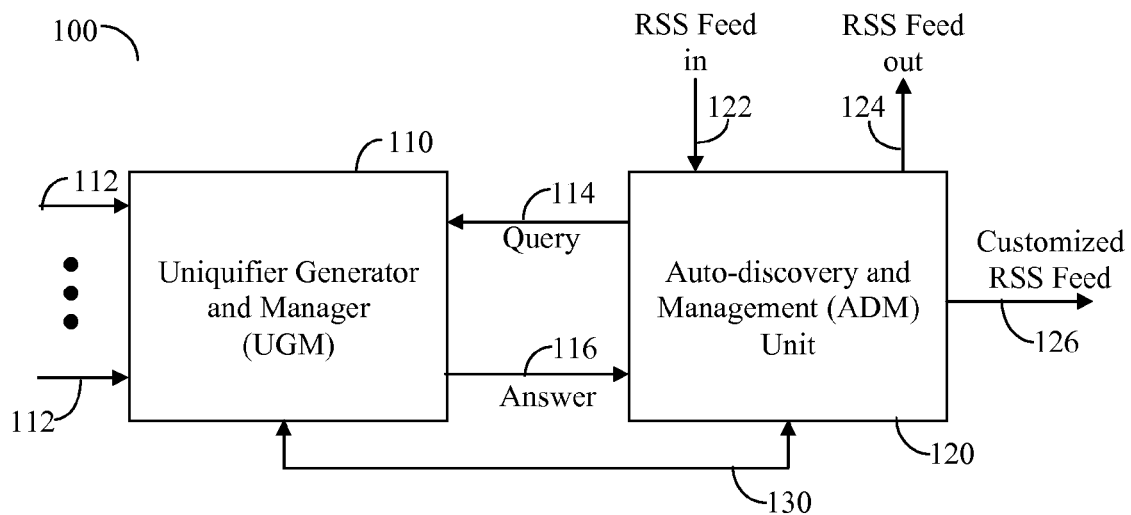
FIG. 1 is a schematic block diagram of an architecture of a system in accordance with the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention enable automatic management of information feeds, such as Really Simple Syndication (RSS) feeds, Atom syndication formats, and the like. The burden of identifying, registering unregistering and otherwise management of RSS feeds, would be relieved from the user. The solution provides the most complete RSS coverage with minimal false positives working in three iterative phases: registration to a multitude of RSS feeds, filtering relevant data from the RSS feeds and presenting them to the user, and continuously collecting feedback for determining whether to unregister to RSS feeds that does not provide data that the user use, all based on the user's uniquifiers.

FIG. 1 shows an exemplary and non-limiting schematic block diagram of a system 100 constructed in accordance with the principles of the invention. The system 100 comprises of an uniquifier generator and manager (UGM) 110 and an auto-discovery and management (ADM) unit 120. The system 100 may be embodied in a user device such as, but not limited to, a personal computer (PC), a personal digital assistance (PDA), a mobile phone, a smart phone, and the like. The UGM 110 receives a plurality of sensory information through sensor inputs 112 and generates uniquifiers of two types, one type is the labeled uniquifiers (LUs) and the other type is the unlabeled uniquifiers (UUs). An uniquifier is a piece of information that provides unique information about the user of the user device. The UGM 110 also receives queries through interface 114 and provides answers thereto through interface 116. Detailed description of the UGM 110 may be found in the co-pending patent application entitled "An Apparatus and Methods for Providing Answers to Queries Respective of a User Based on User Uniquifiers", to Emanuel, et al. (hereinafter the "Emanuel") filed concurrently with present application, assigned to common assignee, and which is incorporated herein by reference for all that it contains.

The ADM unit 120 generates queries to the UGM 110 respective of information feeds (or streams), for example, RSS feeds. By extracting data from the RSS feed, the ADM unit 120 generates a query to the UGM 110 by checking whether such data fits the uniquifiers of the user using a user device. Based on the answers provided by the UGM 110 to the ADM unit 120, the unit 120 may register to a RSS feed that is potentially of interest to a user based on the user's uniquifiers. Conversely, the ADM 120, when appropriate, relinquishes registration to the RSS feed when the user's interests change as shown based on the uniquifiers or other checks as further described below. Moreover, and as further discussed in Emanuel, a user profile that is a combination of uniquifiers, may change over time, it may be time of day, day of week, and other basis for change, even, for example, the football season for sports but not outside of that period. That is, the user profile is used at a different context of the user use of the user device. The change of a user profile may impact the filtering of data from a RSS feed. Furthermore, as data is provided from a RSS feed that the user was registered to by the system 100, it is possible to check if such data is of interest to the user based on the user's uniquifiers, by presenting queries to the UGM 110. As the operation of the system 100 continues sensory information is gathered through the sensor inputs 112, hence a continuous feedback loop is provided. Therefore, if a user shows certain interest in some RSS feed data over others, this will in turn impact the user's uniquifiers as detected by the UGM 110 and hence refine the type of data the user receives from RSS feeds.

Figure 2:
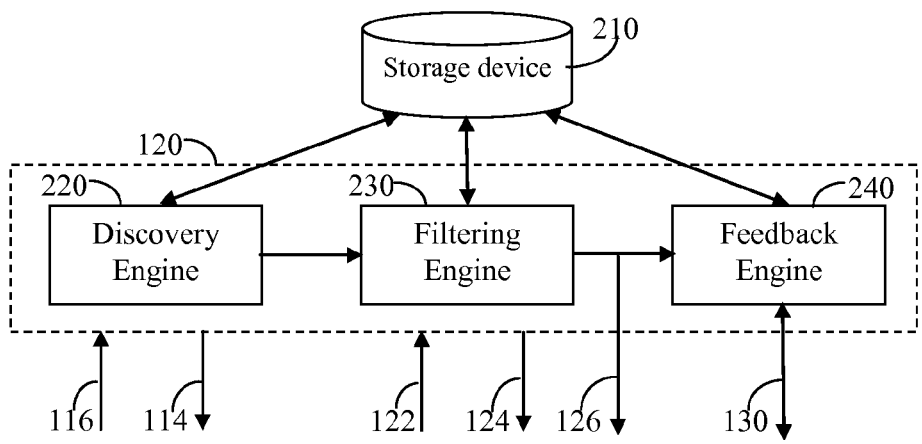
FIG. 2 is a detailed block diagram of auto-discovery and management unit.

FIG. 2 depicts an exemplary and non-limiting block diagram of the ADM unit 120. The ADM unit 120 is comprised of three engines: a discovery engine (DE) 220, a filtering engine (FE) 230, and a feedback engine (FBE) 240. Data from each of these engines may be exchanged with a storage device 210. In one embodiment of the invention, the storage device 210 may be part of a memory embedded in the UGM 110.

The DE 220 is responsible for creating a list of information streams, such as RSS feeds, and selecting those feeds which are potentially of interest to the user of the user device. A more detailed discussion of the operation of the DE 220 is provided with respect of FIG. 3. The list of approved information streams is provided to the FE 230. This list includes the approved information streams or feeds as well as their respective registration information.

The FE 230 can log on and off of each and every approved information stream and filter the data that is provided by that stream. The FE 230 exchanges data with information streams (e.g., RSS feeds) through interfaces 122 and 124. Data output from the FE 230 is provided to the user device for the purpose of, for example, display on the user device over interface 126. A detailed discussion of the operation of the FE 230 is provided with respect of FIG. 4.

The data provided by FE 230 is also provided to the FBE 240 that is responsible for checking the user's response to the data provided by the FE 230. Such monitoring of responses may be done by using the sensory information provided by the UGM 110 over an interface 130 (FIG. 1), or otherwise by other means that enable the tracking of the user interaction with the data being supplied. By monitoring the actual usage made by the user of the user device it is possible to determine if it is necessary to maintain a registration to a feed or it better be removed from the approved list of information streams. A more detailed discussion of the operation of the FBE 240 is provided with respect of FIG. 5.

Figure 3:
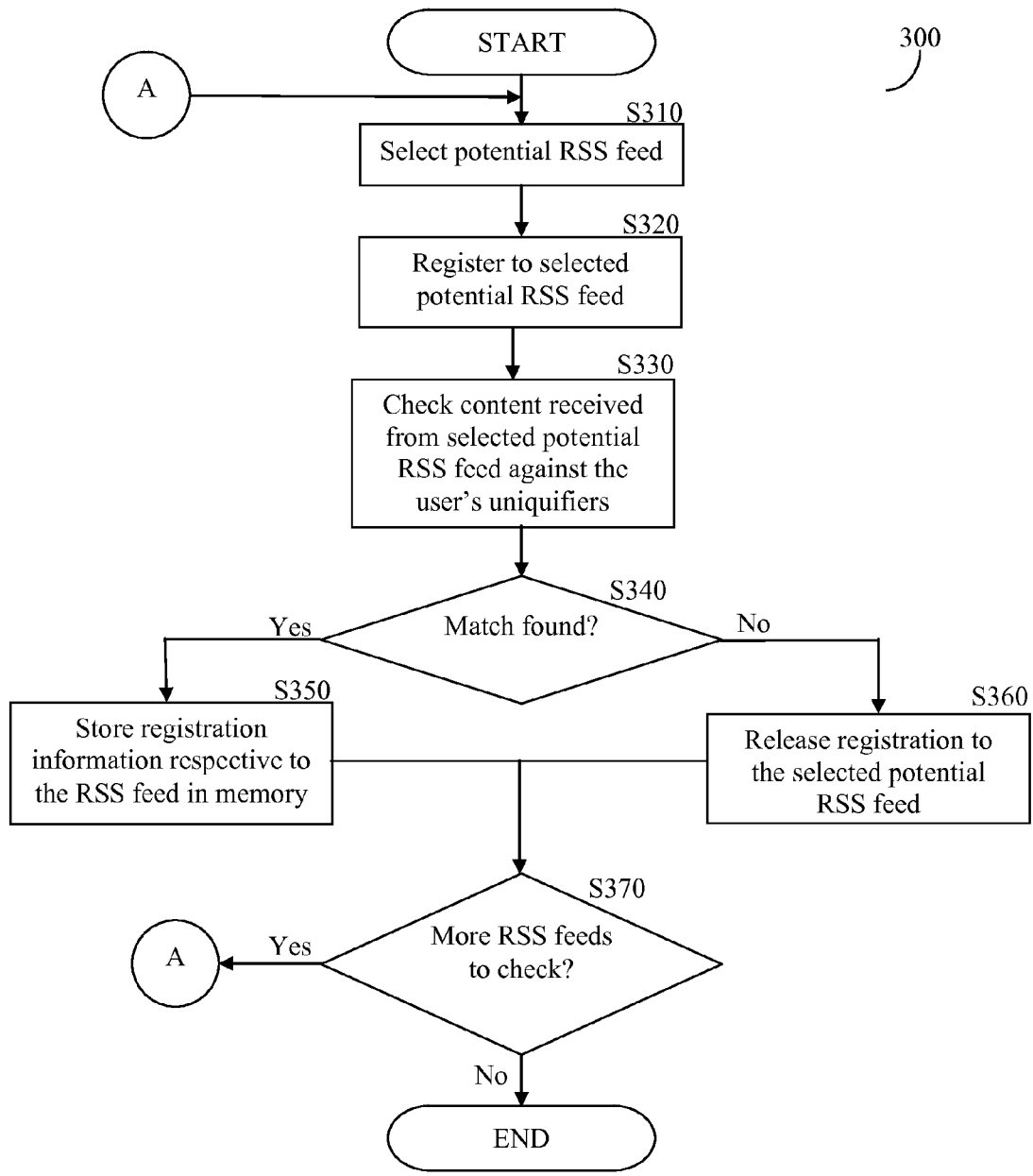
FIG. 3 is a flowchart depicting the process of registering to RSS feeds in accordance with the principles of the invention.

FIG. 3 depicts an exemplary and non-limiting flowchart 300 of the process of discovery of RSS feeds implemented in accordance with the principles of the invention that is performed by DE 220. It should be noted that while RSS feeds are mentioned specifically with respect of this exemplary embodiment, other information feeds or streams may benefit from the principles discussed herein below, as well as with respect to FIGS. 4 and 5 below, and such should not be viewed as limiting upon the scope of the invention.

In S310 an RSS feed is selected from a plurality of possible RSS feeds. The list of possible RSS feeds may be provided to the ADM unit 120 from an external source, or otherwise developed by the ADM unit 120 by, for example and without limitation, by crawling web pages for detection of RSS feeds. In S320 the selected RSS feed is registered to by the DE 220, automatically, without involvement of the user, thereby relieving the user from any need or knowledge of such registration. In S330 data is received from the registered potential RSS feed. The data received from the potential RSS feed is checked against the uniquifiers of the user by accessing the UGM 110 by means of a query over interface 114 and receiving answers over interface 116.

In S340 it is checked whether the answer received from the UGM 110 with respect to the query for the data received from the potential RSS feed matches one or more of the user's uniquifiers, and if so execution continues with S350; otherwise, execution continues with S360. In S350, the DE 220 stored the registration information of the potential RSS feed, now being a qualified RSS feed, in a selected RSS feed list, stored for example in the storage device 210. Such a qualified RSS feed is expected to have content that, according to the check made, fits the user needs. In S360 the RSS feed, found in S340 not to match user needs, is released either permanently or temporarily by either disconnecting from the RSS feed and maintaining the registration or otherwise, by completely canceling registration to that the RSS feed.

In one embodiment of the invention an additional period of monitoring the data provided from the RSS feed is provided, so as to check the relevance of the feed for the user of the user device over an extended period of time. By doing so, it is ensured that the user receives RSS feed content which is relevant to the user's needs. In S370 it is checked whether more RSS feeds are to be checked, and if so execution continues with S310; otherwise, execution terminates.

Figure 4:
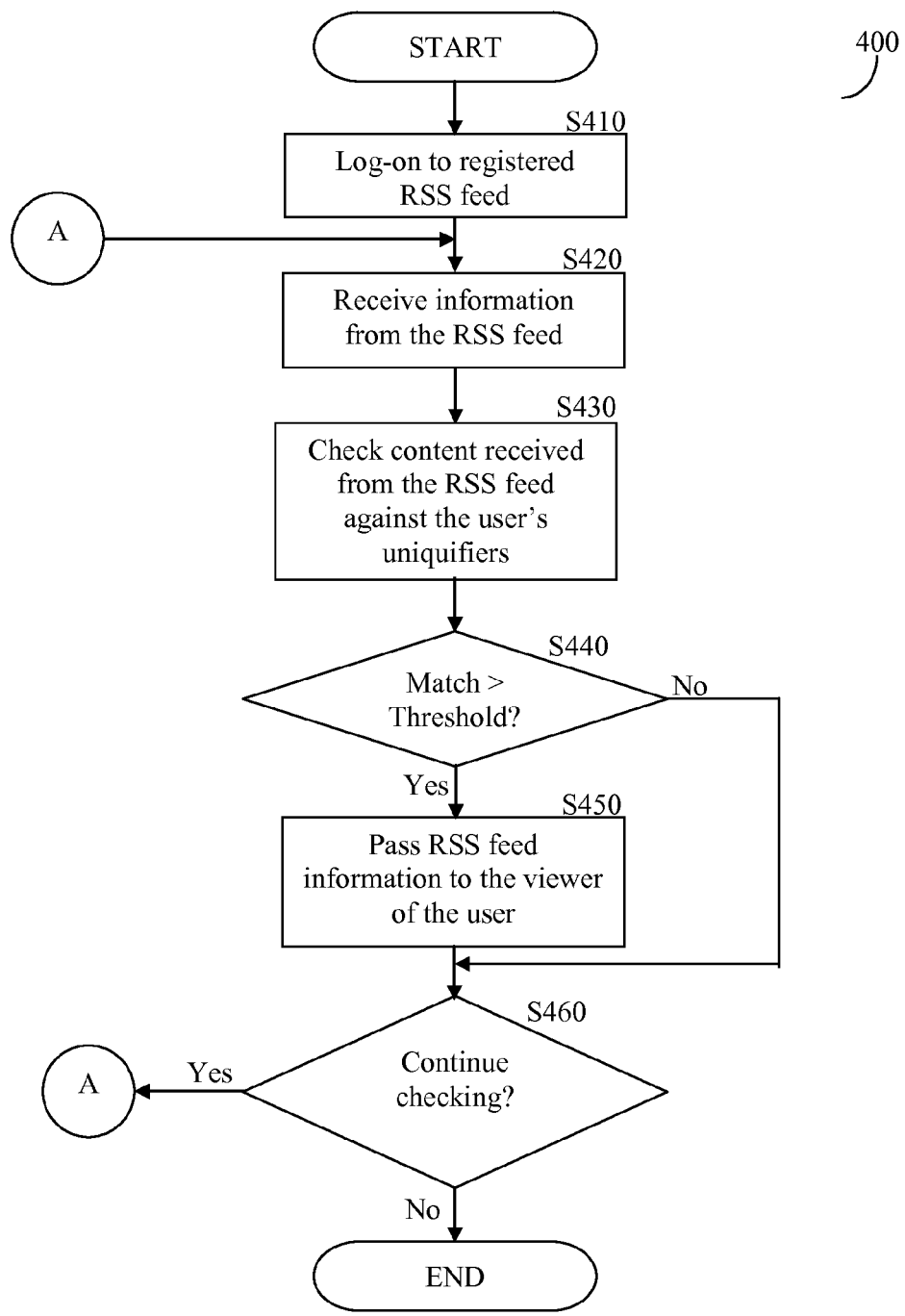
FIG. 4 is a flowchart depicting the process of filtering content of RSS feeds prior to display in accordance with the principles of the invention.

FIG. 4 shows an exemplary and non-limiting flowchart 400 depicting the process of filtering content of RSS feeds prior to display, implemented in accordance with the principles of the invention, by the FE 230. In S410 a RSS feed from the list of approved RSS feeds provided by the DE 220 is logged on, based on the information in the list. In S420 data is received from the RSS feed and in S430 the data is checked against the uniquifiers of the user as discussed in more detail hereinabove. In S440 it is checked if the match between the data and the uniquifiers of the user of the user device is above a predetermined threshold value, and if so execution continues with S450; otherwise, execution continues with S460. In S450 the RSS feed data is provided to the user, for example, for the purpose of viewing by the user. In S460 it is checked if it is necessary to continue filtering data from the RSS feed, for example, when the system reaches a point of being closed down and no more filtering is required. If so, execution continues with S420; otherwise, execution terminates.

It should be noted that this process may be repeated for each and every of the registered and approved RSS feeds. In one embodiment, and as further noted hereinabove, as the user profile changes from one profile, for example the workday profile, to the night profile, the RSS feeds provided for that profile may differ and hence different RSS feeds will be logged on and others be logged off.

Figure 5:
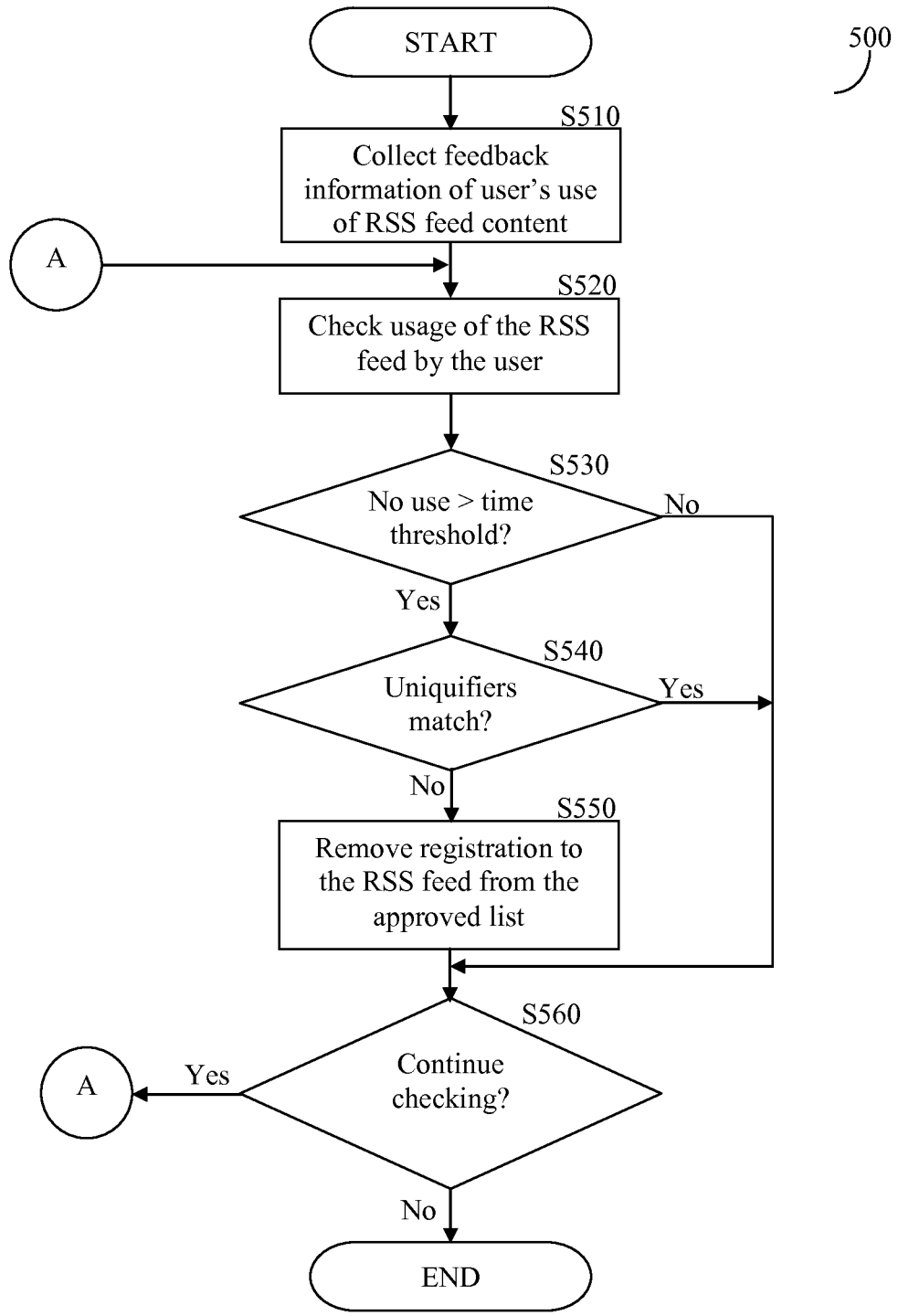
FIG. 5 is a flowchart depicting the process of monitoring the use by a user of RSS feeds and responding thereto in accordance with the principles of the invention.

The operation of the FBE 240 is depicted in FIG. 5 an exemplary and non-liming flowchart 500 of the process of monitoring the use by a user of RSS feeds and responding thereto implemented in accordance with the principles of the invention. In S510 feedback information respective of the usage of the RSS feed content by a user of the user device is collected. Once sufficient information is collected then, in S520, the usage pattern is checked. The usage pattern may include information such a frequency of access, level of interest, and more, in order to generate specific parameters for checking the relevance of the data provided by the RSS feed. S530 and S540 are merely an example of checks that may be performed by the FBE 240, other tests to determine specific usage patterns of interest in such a system 100 would be apparent to one of ordinary skill in the art.

In S530 it is checked if there was no use of information provided by the RSS feed for a period of time exceeding a time threshold, and if so execution continues with S540; otherwise, as the data from the RSS feed was used, execution continues with S560. In S540 it is checked whether the data provided by the RSS feed still maintains a high uniquifier match, or at least a match above a predetermined threshold, and if so execution continues with S560 as the data may still be relevant to the user in the future; otherwise, execution continues with S550.

In S550 the registration to the RSS feed is removed from the approved RSS feed list as it is determined that the RSS feed is not valuable for the user of the user device. Providing this feature automatically, without the intervention of the user, provides a significant benefit to the user as the user is not required to manually perform such a removal. In S560 it is checked if the process should continue and if so execution continues with S520; otherwise execution terminates. The process may be repeated for each RSS feed independently.

To further explain the functionality according to the invention several practical non-limiting examples are now provided. As noted above, in certain embodiments, the process carried by the system 100 comprises of: a) registering to a wide range of optional RSS feeds; b) filtering relevant data and presenting it to the user; and, c) collecting feedback and fine tuning the RSS feed list by removing filtered feeds and learning which methods provide the most relevant feed to the users for future registration. These steps are repeated throughout the operation of system 100. All operations are performed in conjunction with the UGM 110 that provides feedback for the selection of RSS feeds and content thereof. Therefore the system 100 automatically manages the registration and un-registration of RSS feeds in a manner corresponding to the user areas of interest based on the user's identified uniquifiers. The system 100 further filters incoming RSS items and displays only items relevant to the user based on the user's uniquifiers. Furthermore, the system 100 tracks its success, measured by the level of interest the user shows with respect to the RSS items presented, and adjusts its RSS discovery registration, removal and filtering strategy, based at least in part on the user's uniquifiers.

For the purpose of RSS feeds' discovery and registration the system 100 tracks the browsing history of the user and automatically registers the user to an RSS feed of any web page that the user browsed and showed interest in. In addition to checking the uniquifiers this may be further determined by identification of a longer stay time, bookmarking of a page, digging for additional information respective of the page viewed, sending a link of the page to another person, repeated visits to the web page, and more. The system 100 may further search entire web sites corresponding to a universal resource locator (URL) that the user commonly visits, for the purpose of finding RSS feeds not otherwise presented. This process may be repeated for each new web sites visited by the user. Using, for example, global uniquifiers (GU), the system 100 may perform active search for a user area of interest using the user's profile and registering the best RSS that comes up as a result from this search. This further enables the system 100 to register the user to RSS feeds used by other users with similar uniquifiers. A GU is a synthetic uniquifier that is created by assuming certain terms that are expected to be part of a GU.

In one embodiment RSS feed lists are provided from other users that grant the system permission to use their respective RSS lists. In another embodiment of the invention, the system 100 registers the user to sites of popular news, audio or video items, for example, digg (www.digg.com), Youtube® most popular, Twitter trends, Google trends, and the like. In yet another embodiment of the invention the system 100 receives a list of recommended RSS feeds for specific topics from a central server dedicated for providing recommendations as to popular or relevant RSS feeds. This can be matched against the user interests based on the user's uniquifiers and upon a match the system 100 registers the user to those RSS feeds. Similarly, the system 100 may register the user to RSS feeds of blogs, for example blogs of friends and social circles as extracted from the user's social web network. These include, but are not limited to, Facebook®, Twitter®, web mail and the likes. The selection may be further filtered using the uniquifiers of the user to ensure that the RSS feeds of the blogs are actually those that the user is interested in receiving.

The collected RSS feeds are filtered, typically using the UGM 110, to assess the relevance to the user of the user device by means of a query and reception of an answer. The system 100 therefore collects data items received from the different RSS feeds. When data items description is short, the system 100 fetches the complete article to get a better understanding of the content of the item, for example by checking it against the uniquifiers of the user using UGM 110. When data items are not textual the system retrieves tags and other metadata that describe the content item, e.g., author, subject, popularity, description, which may then be checked against the user's uniquifiers. When a data item is of a specific type, such as video or audio, the system 100 searches open media databases, such as IMDB and the like, to collect metadata information and tags about the item. The metadata and tags may then be used to match with the user's uniquifiers. In the process the system 100 removes duplicate items and presents them as a single item. The system 100 presents the full item with metadata information to the personal profile filter, e.g., the UGM 110, and in response gets an answer which may be a score indicating the level of interest the user is expected to have for the checked data item. The system 100 displays to the user the data items with the best scores for the different interests the user may have and collects feedback about the user actions on each item as discussed hereinabove. In one embodiment of the invention the system 100 further enables the user to request more information of the same subject, overriding the score given by UGM 110.

The system 100 naturally collects feedback by using the sensor inputs 112. In the feedback loop the system 100 collects the user feedback, implicitly or explicitly, respective of the selected data items provided by a RSS feed. This feedback may be further used by the UGM 110 to provide an updated score for the RSS feed, in response to a query respective of the RSS feed. The score represents the value of the specific RSS feed to the user. The score varies over time as a RSS feed that was valuable, for example, last week might not be valuable in a preceding week. Feeds with high score are considered to be valuable RSS feeds. The score is built using many parameters but one of the most important factors is the ratio of good items versus the ratio of spam items that passed the filter, in a sense a merit of a signal to noise ratio as far as the user is concerned. The system tracks this ratio over time. In accordance to an embodiment of the invention the system 100 automatically unregisters non valuable RSS feeds. The system 100 further tracks the logic that lead to the registration of valuable feeds, and puts more emphasis on those methods for the specific user in future RSS feed discovery and registration.

The principles of the invention may be implemented in hardware, firmware, software or any combination thereof. Moreover, the software is preferably implemented as an application program tangibly embodied on a program storage unit or computer readable medium that may consist of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. While information feeds were explained with respect of RSS feeds, other feeds are possible, including but not limited to ATOM and other versions of RSS such as RSS 2.0. The ATOM syndication format is an XML language used for web feeds.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A method for management of information streams delivered for use by a user of a user device, comprising:
   discovering information streams relevant to the user using a plurality of uniquifiers, wherein each uniquifier of the plurality of uniquifiers characterizes the user and resides on the user device;
   adding the discovered information streams to a list of approved information streams;
   registering to at least one information stream in the list of approved information streams;
   filtering data provided by the at least one information stream using the plurality of uniquifiers;
   continuously monitoring actual user usage patterns of the filtered data based on current sensory information obtained from the user,
   continuously collecting said monitored actual user usage patterns including at least frequency of access and level of interest of the filtered data,
   providing a continuous feedback of the relevancy to the user of the at least one registered information stream based on results from the continuous monitoring and collecting to enable improved discovery and filtering of future information streams which may be relevant to the user, and
   managing the registration and un-registration of information streams in a manner corresponding to the user areas of interest based on a monitored actual usage of the at least one registered information stream by the user.

2. The method of claim 1, wherein discovering the information streams comprises:
   accessing a list of potential information streams;
   registering to at least one of the potential information streams;
   determining the relevance of the at least one potential information stream to the user of the user device based on at least the plurality of uniquifiers; and
   responsive of the determined relevance performing any one of canceling registration to the at least one potential information stream if the relevance of the at least one information stream is below a predefined threshold value; adding the registration information for the at least one potential information stream to the list of approved information streams if the relevance of the at least one information stream is above the predefined threshold value.

3. The method of claim 2, wherein accessing the list of information streams further comprises:

retrieving a list of information streams from an external source to the user device.

4. The method of claim 1, wherein the information stream is at least one of a really simple syndication (RSS) feed and an Atom syndication format.

5. The method of claim 1, wherein filtering data provided by the at least one information stream further comprises:
registering to at least one information stream in the list of approved information streams;
receiving data from the at least one information stream;
checking the data against uniquifiers of the user of the user device; and
providing the filtered data based on the checked data that has an indication of matching at least a uniquifier of the plurality of uniquifiers.

6. The method of claim 1, wherein the uniquifiers are at least one of labeled uniquifiers (LUs), unlabeled uniquifiers (UUs), and global uniquifiers (GUs).

7. The method of claim 1, wherein the user device is one of a personal computer (PC), a personal digital assistant (PDA), a mobile phone, a smart phone.

8. The method of claim 1, wherein the list of approved information streams is part of a user profile, wherein the user profile is used at a different context of the user usage of the user device.

9. The method of claim 1, further comprises:
presenting to the user of the user device the filtered data from the at least one information stream.

10. The method of claim 1, wherein the improved future discovery and filtering is achieved by at least updating at least the plurality of uniquifiers.

11. The method of claim 1, further comprises:
canceling registration to an information stream based on at least one of the feedback, wherein the feedback further comprises percentage of items that are of interest to the user.

12. The method of claim 1, is executed by computer executable code stored in a non-transitory computer readable medium.

13. A system for management of information streams delivered for use by a user of a user device comprising:
a uniquifier generator and manager (UGM) residing on the user device for answering queries responsive to data collected by a plurality of sensors, wherein answers are provided based on a plurality of uniquifiers, wherein each uniquifier of the plurality of uniquifiers characterizes the user and resides on the user device;
a discovery engine (DE) for discovering information streams relevant to the user based on queries presented to the UGM and answers received thereto, wherein the discovered information streams are added to a list of approved information streams;
a filtering engine (FE) for registering to at least one approved information stream in the list of approved information streams and filtering data provided by the at least one approved information stream based on queries presented to the UGM and answers received thereto; and
a feedback engine (FBE) for continuously monitoring actual usage of the filtered data by the user of the user device based on sensory information provided by the UGM, and continuously collecting said monitored actual user usage patterns including at least frequency of access and level of interest, and providing a continuous feedback of the relevancy to the user of the at least one registered information stream based on results from the continuous monitoring and collecting, said feedback engine being further configured to initiate a release of said at least one information stream found not to be applicable to the user of the user device based on said continuous monitoring, continuous collecting and continuous feedback.

14. The system of claim 13, wherein the list of approved information streams is part of a user profile.

15. The system of claim 14, wherein the FE further accesses a plurality of user profiles, each of the plurality of user profile includes a list of approved information streams, wherein each user profile is used at a different context of the user usage of the user device.

16. The system of claim 13, wherein the information stream is at least one of a really simple syndication (RSS) feed and an Atom syndication format.

17. The system of claim 13, wherein the DE further retrieves a list of information streams from external resources to the user device.

18. The system of claim 13, wherein the uniquifiers are at least one of uniquifiers (LUs), unlabeled uniquifiers (UUs), and global uniquifiers (GUs).

19. The system of claim 13, wherein the user device is one of a personal computer (PC), a personal digital assistant (PDA), a mobile phone, and a smart phone.

20. The system of claim 13, further comprising:
presenting the filtered data to user.

* * * * *